United States Patent [19]

Schreiber

[11] Patent Number: 4,859,341
[45] Date of Patent: Aug. 22, 1989

[54] METHOD FOR CONTROLLING AERATING UNITS IN A WASTEWATER TREATMENT PROCESS

[75] Inventor: Berthold Schreiber, Langenhagen, Fed. Rep. of Germany

[73] Assignee: Schreiber Corporation, Inc., Trussville, Ala.

[21] Appl. No.: 939,092

[22] Filed: Dec. 8, 1986

[51] Int. Cl.$^4$ .................................................. C02F 3/20
[52] U.S. Cl. ...................................... 210/614; 210/626
[58] Field of Search ................ 210/614, 745, 626–628, 210/96.1, 199

[56] References Cited

U.S. PATENT DOCUMENTS

| | | | |
|---|---|---|---|
| 3,342,727 | 9/1967 | Bringle | 210/614 |
| 4,179,366 | 12/1979 | Koelin | 210/614 |
| 4,333,838 | 6/1982 | Ballnus | 210/745 X |
| 4,437,992 | 3/1984 | Saito et al. | 210/614 X |

Primary Examiner—Tom Wyse
Attorney, Agent, or Firm—Bell, Seltzer, Park & Gibson

[57] ABSTRACT

A method for the treatment of wastewater wherein the turbidity level of the wastewater is monitored to control the operation of the aerating units, while simultaneously, the oxygen concentration in the aerating tank is monitored to control the staging of the aerating units between the maximum and minimum turbidity levels.

4 Claims, 1 Drawing Sheet

METHOD FOR CONTROLLING AERATING UNITS IN A WASTEWATER TREATMENT PROCESS

BACKGROUND OF THE INVENTION

1. Field of the Invention

This invention relates to a process for the treatment of wastewater, and more particularly to a process for the control of aerating units in a wastewater treatment plant.

2. Description of the Related Art

Wastewater treatment aeration units are commonly controlled by monitoring the oxygen concentration in the wastewater. However, this method of controlling the aeration units has major disadvantages. Oxygen concentration, according to experience, cannot be measured with any degree of accuracy below a level of 0.5 mg/l. Therefore, the lower limit control point for starting operation of the aeration units is set at no lower than 0.5 mg/l of dissolved oxygen. Normally, the aeration units are re-started when the oxygen value goes below the lower control point, even though additional oxygen may not be required because the wastewater treatment process may, under certain conditions, be effectively operated with oxygen concentrations below 0.5 mg/l. Control of the aeration units by monitoring the oxygen concentration thereby results in unnecessary consumption of power and higher than necessary operating costs.

Recently, biological clarification processes have been suggested whereby oxic, e.g., aerobic and anoxic, e.g., anaerobic phases of the wastewater are alternate as, for instance, in the simultaneous denitrification process. In this process, from one-half hour to six hours is normally required to meet the anoxic demands, that is the condition of lowest dissolved oxygen concentration, because of swings in the wastewater conditions, e.g., variations in the oxygen concentration of entering wastewater. Even as much as twelve hours have been found to be required. Anoxic demands cannot be met by controlling the aeration units in accordance with the oxygen concentration since, during the anoxic phase, the dissolved oxygen concentration should be maintained below about 0.5 mg/l and, at a minimum, the oxygen concentration does not fall below the 0.5 mg/l due to the monitoring limitations of the oxygen sensor previously discussed. Hence, the control of the aeration units by the oxygen parameter is not effective in attaining optimum economic operation and cannot be utilized in certain types of further wastewater treatment and clarification, such as in simultaneous denitrification.

Another system for the control of the aeration units constantly measures the turbidity of a clarified effluent from a waste water-activated sludge mixture by means of an electric turbidity meter. Signals representative of turbidity level are utilized to control the aerating units. In this process the aerating units are shut down when a predetermined minimum turbidity value has been reached and re-started only when a maximum value is exceeded. Operating the aeration units in this manner eliminates the above-mentioned disadvantages of controlling the aeration devices by the oxygen parameter, since it conserves energy, reduces operating costs and makes the anoxic denitrification process possible. However, while aeration units are in operation, oxygen concentrations may be attained far in excess of those required by the process. Oxygen concentrations as high as 3 to 5.0 mg/l may be attained in the aeration tank during the oxic phase, even though concentrations of 0.5 to 1.5 mg/l are often sufficient. These uneconomically high oxygen concentrations may be attained if the aerating basins are not fully loaded or if the aeration units are designed for short term, high loadings. Designers, as well as operators of the wastewater treatment plants, encourage the uneconomically high oxygen concentrations if they permit the installation of aeration units having excess capacity, e.g., for safety reasons.

It is therefore an object of the instant invention to provide a method for the treatment of wastewater which economically utilizes the aerating units while providing only that amount of dissolved oxygen required to carry out the wastewater treatment.

It is a further object of the invention to provide a method for the treatment of wastewater which controls the dissolved oxygen concentrations within required levels during both oxic and anoxic phases.

Additional objects and advantages of the invention will be set forth in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

To achieve the foregoing objects, and in accordance with the purposes of the invention as embodied and broadly described herein, there is provided a method for the treatment of wastewater by use of activated sludge generated in an aeration tank having a plurality of aeration units operable to be selectively activated and deactivated for introducing oxygen into the aeration tank, comprising the steps of: withdrawing a stream of clarified water from the aeration tank; monitoring the turbidity of the clarified water stream; monitoring the oxygen concentration in the aeration tank; and selectively activating and deactivating the plurality of aerating units in the aeration tank in accordance with the monitored turbidity and oxygen concentration.

It is further preferable that the operation of at least one aerating unit is solely controlled by the monitored turbidity.

BRIEF DESCRIPTION OF THE DRAWINGS

The accompanying drawing, which is incorporated in and constitutes a part of the specification, illustrates a presently preferred embodiment of the invention and, together with the general description given above and the detailed description of the preferred embodiment given below, serves to explain the principles of the invention.

DESCRIPTION OF THE PREFERRED EMBODIMENT

Figure 1:
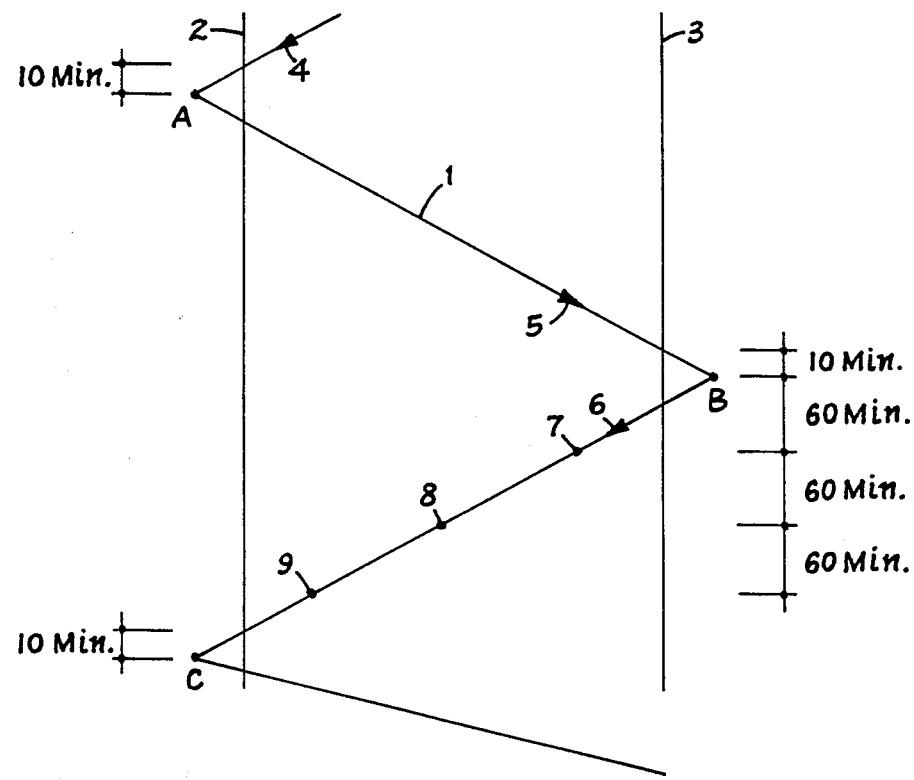
FIG. 1 is a diagram illustrating the method of the instant invention showing the control points at which the aerating units are alternately activated and deactivated.

Reference will now be made in detail to the present preferred embodiment of the invention.

The invention offers a method for the treatment of waste water described above, which will improve the process so that considerable energy savings may be realized in starting and stopping operation of the aeration units. The invention accomplishes this by way of simultaneous monitoring of turbidity and dissolved oxygen concentration and utilizing these monitored parameters to activate and deactivate aerating units, and also to stage the operation of the aerating units and control the number of units which are operating at any given instant. Preferably, a turbidity sensing control decides first whether the aeration units should be in operation or not, and secondly, an oxygen sensing control determines the appropriate staging of the aerating units.

The turbidity control senses when a minimum and maximum turbidity limit has been exceeded. The oxygen control senses the dissolved oxygen concentration within selected maximum and minimum values to determine the number of aeration units required to be operated, and thus adjusts aeration to the momentary oxygen demand. When the turbidity level is at a maximum, the oxygen concentration is at a minimum and vice versa. If the maximum turbidity limit is exceeded during the measuring period, the control system will cause all of the aeration units to be activated and the units will then be deactivated on a staged basis in accordance with the oxygen concentration.

Preferably, the turbidity control is solely responsible for the operation of at least one aeration unit so that at least one unit is operating when the minimum turbidity limit is reached. If turbidity readings go below the minimum turbidity set point, all aeration units are shut down to conserve energy and to achieve anoxic process conditions. The aeration units are restarted when the maximum turbidity set point has been reached, thus providing the required momentary oxygen demand. In this manner it is possible to control the oxygen concentration below 0.5 mg/l, and to insure that during anoxic phases of treatment the oxygen level is maintained at the desired level.

To measure the turbidity, a stream of the activated water-sludge mixture is separated into clarified water and sludge. The turbidity of the clarified water is monitored continuously with an electric turbidity meter. These impulses record the progress of the clarification process and are utilized for the control of the aeration units. The oxygen concentration is measured continuously by an oxygen analyzer. Electric signals are generated by the oxygen analyzer in response to the measured oxygen concentration to control operation of the aeration units.

The invention is explained in greater detail by reference to FIG. 1. A curve 1, similar to that of a recording instrument, shows the progress of the process as well as the control points.

In accordance with the method of the invention, activated sludge is separated from the wastewater being treated and the turbidity of the wastewater is monitored. With the aerating units in operation the turbidity curve approaches the minimum turbidity limit shown as vertical line 2, and control point A is reached. This part of the curve is marked by arrow 4. Simultaneously with monitoring the turbidity, the dissolved oxygen concentration in the aeration tank is monitored. Preferably, the control system used with the instant method senses when the minimum and maximum turbidity levels are exceeded for a preselected period of time. As shown in FIG. 1 by way of example and not limitation, this preselected period of time is 10 minutes. With continuous flow of wastewater into the aeration tank the turbidity level increases toward the maximum turbidity limit, vertical line 3, and control point B is reached.

In accordance with the instant invention, the aerating units in the aeration tanks are selectively activated and deactivated in accordance with the monitored turbidity level and oxygen concentration. Preferably, when the minimum turbidity level 2 is exceeded for the selected period of time all of the aerating units are deactivated. With the aerating units deactivated the turbidity level will increase along curve 1 between control points A and B. When the maximum turbidity level 3 is exceeded for a selected period of time all of the aerating units are activated. With the aerating units activated, the oxygen concentration will increase and the turbidity level will decrease along curve 1 between control points B and C. During this phase the control system causes the aeration units to be deactivated on a staged, step-wise basis in accordance with the monitored oxygen concentration. This staged deactivation of aerating units is illustrated by control points 7, 8 and 9 on curve 1 where selected ones of the aerating units are deactivated sequentially. The staging of the aerating units may also be carried out to activate selected ones of the aerating units in accordance with the monitored oxygen concentration when curve 1 progresses from minimum to maximum turbidity between control point A and control point B.

Preferably, in the aeration phase, i.e., the phase between vertical lines 2 and 3 in FIG. 1, which is regulated by the oxygen concentration, the staged step-wise shut-down of single aerating units in response to the oxygen concentration is done only until the last aerating unit is reached. The last aerating unit is solely controlled by the sensed turbidity value and will only be shut down upon reaching the minimum turbidity value. In this manner the turbidity control parameter determines if all the aerating units are to be started or stopped, while the oxygen control parameter determines how many aerating units in the aerating tank are to operate to satisfy the momentary oxygen demand.

Additional advantages and modifications will readily occur to those skilled in the art. The invention in its broader aspects is, therefore, not limied to the specific details, representative apparatus and illustrative example shown and described. Accordingly, departures may be made from such details without departing from the spirit or scope of the general inventive concept as defined by the appended claims and their equivalents.

What is claimed is:

1. A method for the treatment of wastewater by use of activated sludge generated in an aeration tank having a plurality of aerating units operable to be selectively activated and deactivated for introducing oxygen into said aeration tank, comprising the steps of:
    (a) withdrawing a stream of activated sludge-wastewater mixture from the aeration tank;
    (b) separating the activated sludge-wastewater mixture into clarified water and settled concentrated solids;
    (c) monitoring the turbidity of the clarified water;
    (d) monitoring the oxygen concentration in the aeration tank;
    (e) selectively activating and deactivating said plurality of aerating units in response to both said turbidity and oxygen concentration by:
        (i) activating at least one of said aerating units in response to a predetermined maximum turbidity limit being reached; and
        (ii) inactivating at least one of said aerating units in response to an increase in the monitored oxygen concentration; and (f) cyclically repeating the elements of step (e) above.

2. The method of claim 1, wherein said selectively activating and deactivating step (e) further comprises the step of:

(iii) activating at least one of said aerating units in response to a decrease in the monitored oxygen concentration;

said step of activating at least one of said aerating units in response to a decrease in the monitored oxygen concentration, and said step of activating at least one of said aerating units in response to a predetermined maximum turbidity limit being reached, together activating all of said aerating units.

3. The method of claim 1, wherein said inactivating step (ii) leaves at least one of said aerating units in operation, and wherein said inactivating step (ii) is followed by the step of:

(iii) inactivating the rest of said aerating units in response to a predetermined minimum turbidity limit being reached.

4. A method for the treatment of wastewater by use of activated sludge generated in an aeration tank having a plurality of aerating units operable to be selectively activated and deactivated for introducing oxygen into said aeration tank, comprising the steps of:

(a) withdrawing a stream of activated sludge-wastewater mixture from the aeration tank;

(b) separating the activated sludge-wastewater mixture into clarified water and settled concentrated solids;

(c) monitoring the turbidity of the clarified water;

(d) monitoring the oxygen concentration in the aeration tank;

(e) selectively activating and deactivating said plurality of aerating units in response to both said turbidity and oxygen concentration by:

(i) activating at least one of said aerating units in response to a predetermined maximum turbidity limit being reached; and (ii) activating at least one of said aerating units in response to a decrease in the monitored oxygen concentration, said step of activating at least one of said aerating units in response to a decrease in the monitored oxygen concentration and said step of activating at least one of said aerating units upon a predetermined maximum turbidity limit being reached together activating all of said aerating units; and (iii) inactivating at least one of said aerating units in response to an increase in the monitored oxygen concentration while leaving at least one of said aerating units in operation; and (iv) inactivating the rest of said aerating units in response to a predetermined minimum turbidity limit being reached; and (f) cyclically repeating the elements of step (e) above.

* * * * *